US012145165B2

(12) United States Patent
Lo

(10) Patent No.: US 12,145,165 B2
(45) **Date of Patent: *Nov. 19, 2024**

(54) STRUCTURE OF ROTOR NOZZLE AND WATERING DEVICE

(71) Applicant: YUAN MEI CORP., Changhua Hsien (TW)

(72) Inventor: Shun Nan Lo, Changhua Hsien (TW)

(73) Assignee: YUAN MEI CORP., Chuanghua Hsien (TW)

( * ) Notice: Subject to any disclaimer, the term of this patent is extended or adjusted under 35 U.S.C. 154(b) by 455 days.

This patent is subject to a terminal disclaimer.

(21) Appl. No.: 17/650,819

(22) Filed: Feb. 11, 2022

(65) Prior Publication Data

US 2022/0161280 A1 May 26, 2022

Related U.S. Application Data

(63) Continuation-in-part of application No. 16/785,036, filed on Feb. 7, 2020.

(51) Int. Cl.

| | |
|---|---|
| ***B05B 3/04*** | (2006.01) |
| ***B05B 1/02*** | (2006.01) |
| ***B05B 1/12*** | (2006.01) |
| ***B05B 1/16*** | (2006.01) |
| ***B05B 1/18*** | (2006.01) |
| *B05B 1/30* | (2006.01) |
| *B05B 9/01* | (2006.01) |

(52) U.S. Cl.

CPC .............. *B05B 3/0463* (2013.01); *B05B 1/02* (2013.01); *B05B 1/12* (2013.01); *B05B 1/1654* (2013.01); *B05B 1/185* (2013.01); *B05B 1/3006* (2013.01); *B05B 3/049* (2013.01); *B05B 9/01* (2013.01)

(58) Field of Classification Search

CPC ......... B05B 3/0463; B05B 1/02; B05B 1/185; B05B 1/3006

USPC .................................................. 239/380–389

See application file for complete search history.

(56) References Cited

U.S. PATENT DOCUMENTS

| | | | |
|---|---|---|---|
| 6,129,293 | A | 10/2000 | Jager |
| 9,931,652 | B2 | 4/2018 | Ferrarini |

*Primary Examiner* — Christopher S Kim

(74) *Attorney, Agent, or Firm* — MUNCY, GEISSLER, OLDS & LOWE, P.C.

(57) ABSTRACT

A spray unit of a watering device is equipped with a structure of rotor nozzle, the spray unit is composed of a mounting member and a housing for defining a chamber, a rotor deployed inside the chamber; wherein, at least one stopper set on the inner side of the chamber near the water outlet side is correspondingly matched to multiple guide members on one end of the water outlet of the rotor, and it can be employable to the handy watering device.

10 Claims, 6 Drawing Sheets

STRUCTURE OF ROTOR NOZZLE AND WATERING DEVICE

CROSS REFERENCE TO RELATED APPLICATIONS

This application is a Continuation-in-Part of co-pending application Ser. No. 16/785,036 filed on Feb. 7, 2020, for which priority is claimed under 35 U.S.C. § 120, the entire contents of all of which are hereby incorporated by reference.

BACKGROUND

Technical Field

The present disclosure relates to a nozzle structure of watering device; to be more concrete, which is a rotor nozzle structure with the advantages of easy assembly and steady operation.

Related Art

The conventional structure of rotor nozzle as claimed in patent U.S. Pat. No. 9,931,652 disclosed a housing 2 having a conical chamber 3 as an accommodation for a rotor 12 in column shape, the rotor 12 having one end deployed with water outlet hole 14 connecting to the outlet opening 6 of a spray gun, and the intermediate element 25 having a spherical surface against inner wall of the conical chamber 3 for the rotor 12 in an eccentric arrangement to the longitudinal axis of the conical chamber 3. In this way, when the fluid flows into the chamber 3, it rotates the rotor 12 with tilt current then turning into a swirling steam of 360 degrees running out of the outlet opening 6. Besides, the rotor 12 of this kind of rotor nozzle would also rotate in the chamber 3, thus output fluids would disperse.

SUMMARY

The present disclosure aims to provide a rotor nozzle adopting a longitudinal chamber to apply on a handy spray gun and preventing the rotor from self-rotating, so as to let output fluids concentrate.

Based on above-mentioned goals, the present disclosure provides a structure of rotor nozzle installed inside the spray unit of a watering device, the spray unit is composed of a mounting member and a housing for mutually defining a chamber having one water inlet and one water outlet, and the chamber deployed with a rotor for its end of water outlet connecting to the water outlet side. Wherein, at least one stopper set on the inner side of the chamber near the water outlet side is correspondingly matched to multiple guide members on the end of water outlet of the rotor.

Thanks to the deployment of a stopper, it secures the rotor in a tilt arrangement and dismisses the conventional conical chamber to be applied to existing spray nozzles.

Furthermore, the rotor has a spherical one end connecting to the water outlet of the watering device. Therefore, the water outlet side of the rotor forms at least two annular positioning areas. The present disclosure further provides a watering device for accommodating aforementioned structure of rotor nozzle.

DETAILED DESCRIPTION

Figure 1:
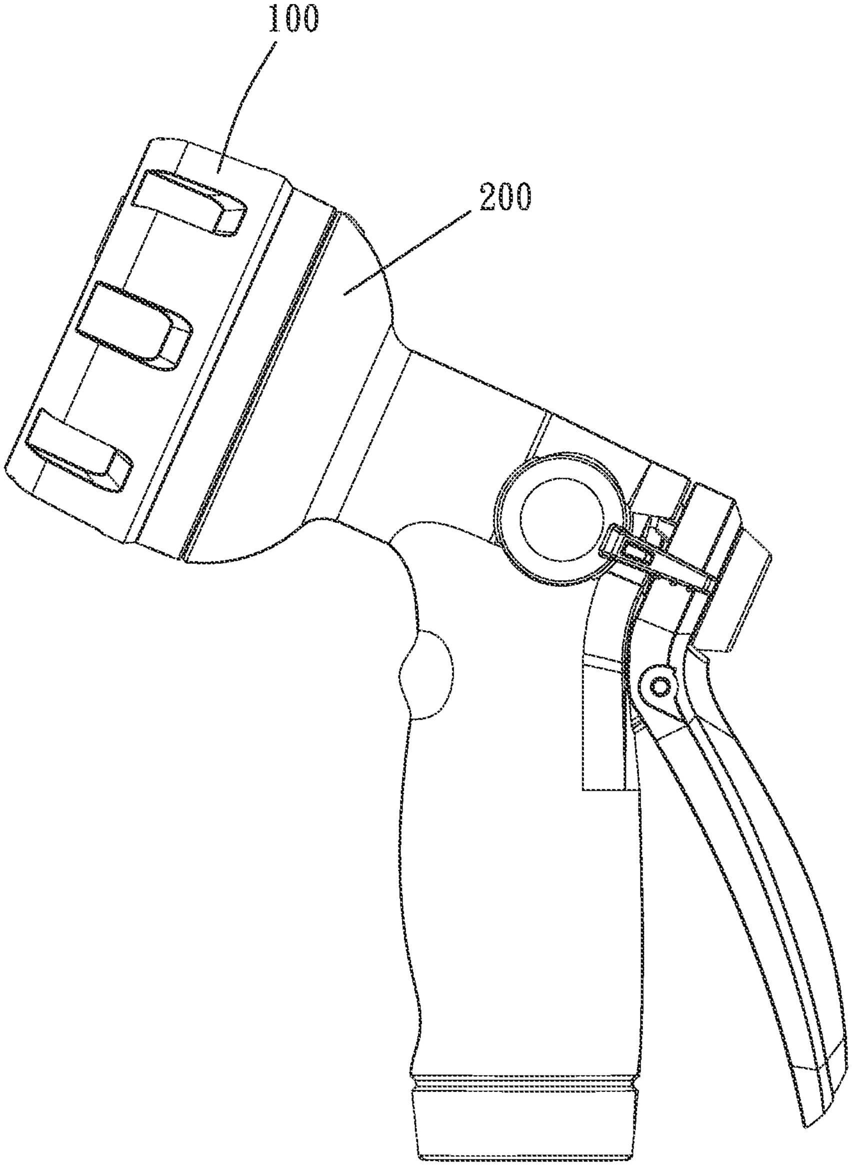
FIG. 1 illustrates a perspective external view in the embodiment of the instant disclosure.
Figure 2:
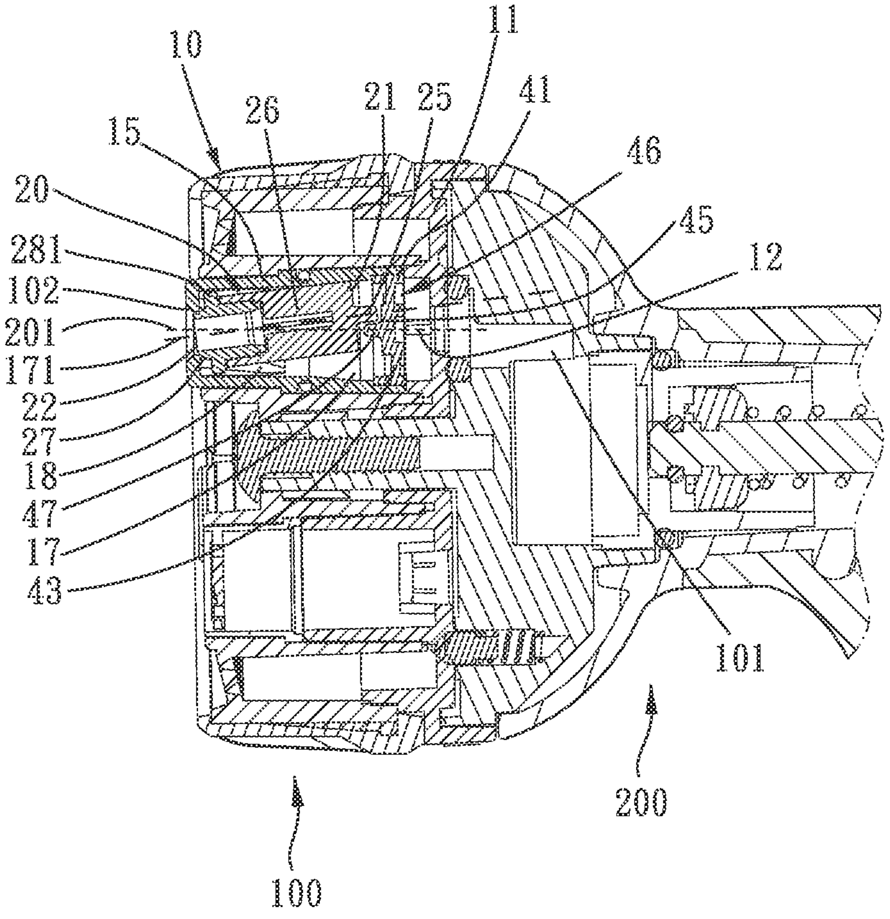
FIG. 2 illustrates a cross-section view in the embodiment of the instant disclosure.
Figure 3:
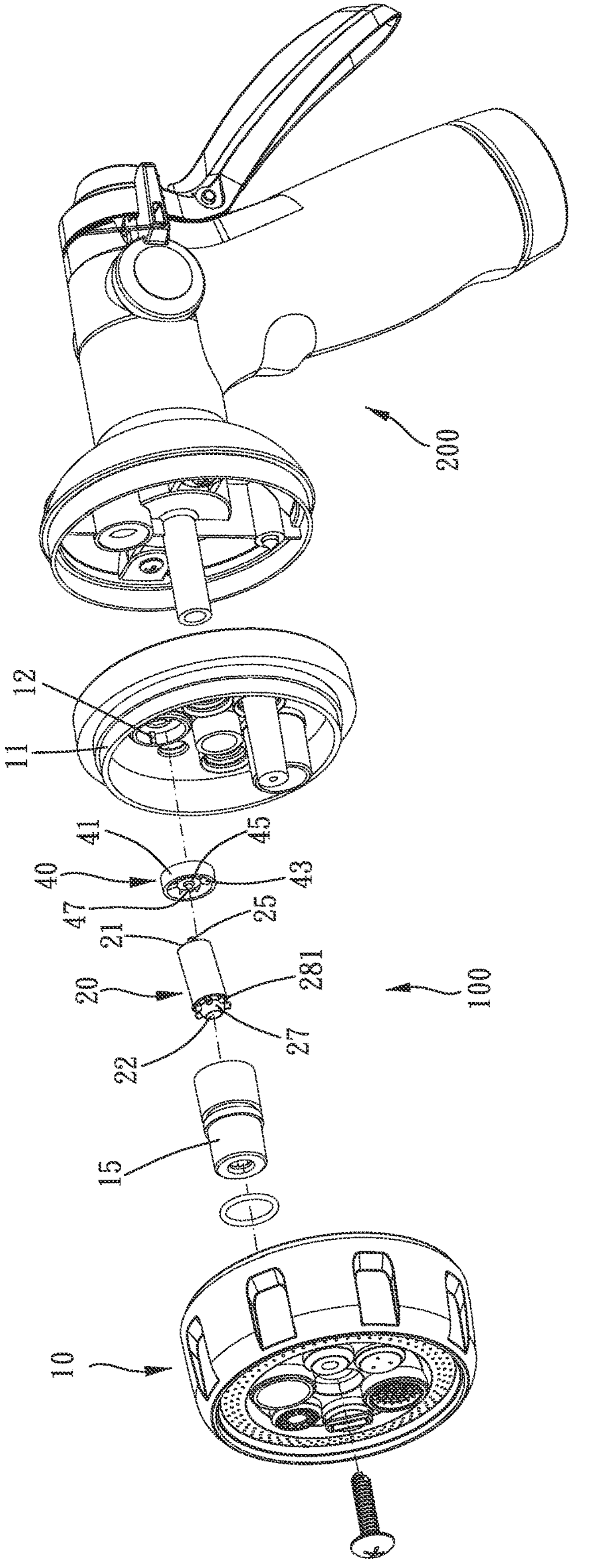
FIG. 3 illustrates an explosive view in the embodiment of the instant disclosure.
Figure 4:
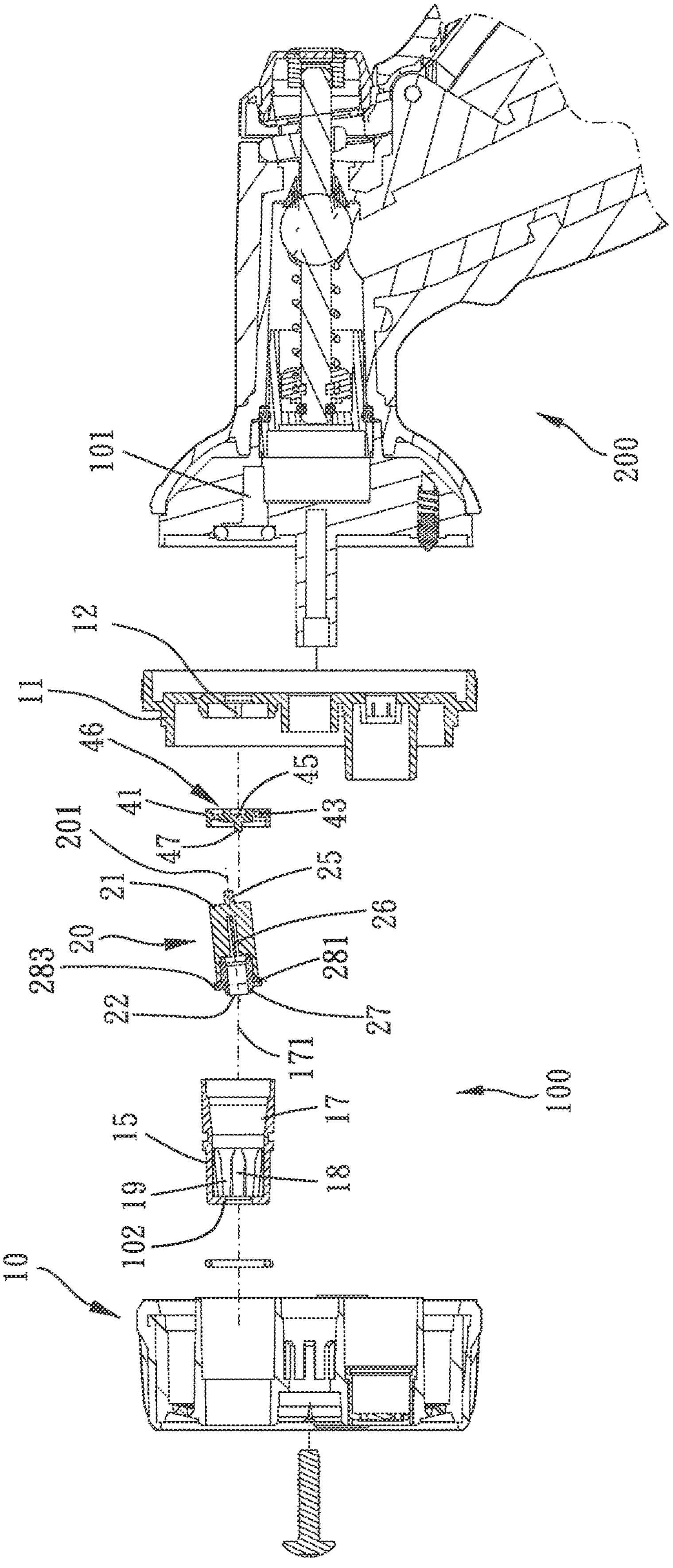
FIG. 4 illustrates a cross-section explosive view of FIG. 3 in the embodiment of the instant disclosure.

Hereinafter to deliberate more specifically the embodiment of the present disclosure, the narration sets forth from which the water outlet of the adjustable watering device for a better understanding by the technicians skillful in the arts.

FIG. 1 to FIG. 4 illustrate a spray unit 100 of a watering device, the spray unit 100 is rotatably installed on the base 200 of the watering device and mainly assembled by an adjusting member 10 and a mounting member 11 correspondingly. Multiple spray heads are set between the adjusting member 10 and the mounting member 11, the spray heads respectively have a water outlet and a water inlet between the adjusting member 10 and the mounting member 11, the mounting member 11 is connected to the water inlet side 101 of the base 200 of the watering device, and the water inlet side 101 is connected to a water supply. Thus, due to the relative rotation between the spray unit 100 and the base 200 of the watering device, one of the spray heads can be connected to the water inlet side 101 of the base 200, so that water from the water supply flows through the water inlet side 101 and inside of the rotor nozzle, and ejects out from the water outlet side 102.

One of the spray heads has structure of rotor nozzle, the structure of rotor nozzle consists of a housing 15, a rotor 20, a flow director 40. Wherein, the housing 15 is roughly a tubular in shape having its front end engaged to the inner wall of the adjusting member 10, so that the water outlet side 102 of the housing 15 located on the adjusting member 10, and the housing 15 has its rear end connected to the mounting member 11 for mutually defining a chamber 17 with a longitudinal interior. A water inlet side 101 of the mounting member 11 extends to the water outlet side 102 of the housing 15 in a direction aligned to a center axis 171 of the chamber 17.

The flow director 40 has an annular base 41 located on the rear opening of the housing 15 and the block 12 on the side wall of the mounting member 11, so that the flow director 40 and the bottom of the mounting member 11 are arranged in a partition formation. Besides, the flow director 40 has a center base 45 spaced from the annular base 41, a position rod 47 protruding from the center base 45 forwards to the direction of the water outlet 102 and aligns to the center axis 171, therefore the position rod 47 of the center base 45 and the water outlet 102 of the of housing 15 define the center axis 171 of the chamber 17, and multiple guide vanes 43 connecting to the inner side wall of the annular base 41 and the outer side wall of the center base 45, the guide vanes 43 are extending along the radial direction of the center base 45 and tangent to the center base 45 respectively at a predetermined angle, a swirl opening 46 is defined between the adjacent guide vanes 43. In other words, the swirl opening 46 is arc-shaped and penetrates the two opposite sides of the annular flow director 40.

The rotor 20 is installed inside the chamber 17 and shapes as a hollow column elongated along a longitudinal axis 201, the rotor 20 having two ends as a water inlet 21 and a water outlet 22. Wherein, the rotor 20 has an inner wall fixed with multiple current blades 26 extending to the water inlet 21 in a crossover formation. The rotor 20 has a spherical end 27 disposed of a water outlet 22 connecting to the water outlet side 102 of the adjusting member 10, and the spherical end 27 and the water outlet side 102 form a complementary mechanism. Besides, the water inlet 21 of the rotor 20 is confined into a annular track between the inner wall of the chamber 17 and the position rod 47 of the flow director 40, and longitudinal axis 201 of the rotor 20 is tilted relative to the center axis of the chamber 17.

The present disclosure provides an embodiment, wherein the chamber 17 near the water outlet side 102 is a longitudinal interior, multiple stoppers 18 protruding on the inner annular wall of the water outlet side 102 of the housing 15, and a slot 19 is formed between the stoppers 18, multiple stop rods are protruded radially on the spherical end 27 of the rotor 20 as guide members 281 and located on the slot 19. The longitudinal axis 201 of the rotor 20, the center axis 171 of the chamber 17 and a radially protruding direction 283 of the guide members 281 approximately intersects, as a result, the spherical end 27 of the rotor 20 being prevented from self-rotating along the longitudinal axis 201 of the rotor 20, but the water inlet 21 of the rotor 20 still moving along the center axis 171 of the chamber 17 in a circular path. Besides, each stopper 18 has a bevel on its surface for guiding the surface of the rotor 20 in tilt arrangement, the water outlet side (the spherical end 27, guide members 281) of the rotor 20 forms at least two annular position areas, the rotor 20 moves steadily in a circular path along an interior surface of the chamber 17 about a center axis 171 of the chamber 17 and a self-rotation of the rotor 20 about a longitudinal axis 201 of the rotor 20 is prevented, in order to generate a centralized linear current spraying out from the water outlet 22 of the rotor 20 instead of the conical spurt produced by rotation of the conventional rotor.

It is worth mentioning that the position rod 47 of the flow director 40 is in a line with the water inlet side 101 and the water outlet side 102. A rod body 25 is extending from one end of the water inlet 21 of the rotor 20 along the rear end of the current blade 26 for locating on the outer wall of the position rod 47 to thereby steady the rotation track of the rotor 20.

When water of the water supply flows to the swirl opening 46 of the flow director 40 from the water inlet side 101, tilt current generated in the chamber 17 drives the rotor 20 to rotate, fluids flows through the water inlet 21 of the rotor 20 to the water outlet side 102 of the spray unit 100 and swirling steam outputs by the rotation of the rotor 20.

Figure 5:
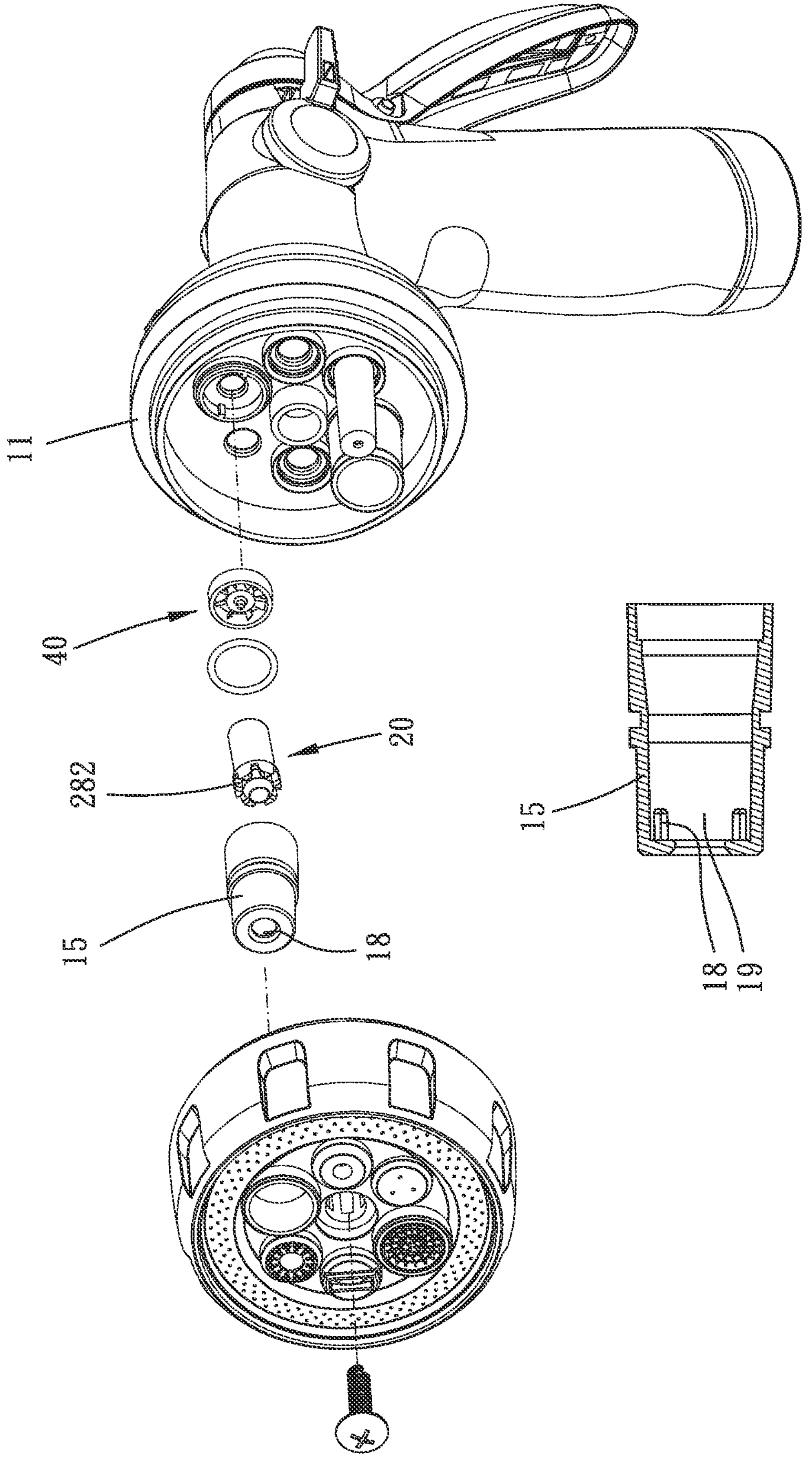
FIG. 5 illustrates another explosive view in the embodiment of the instant disclosure.

Please refer to FIG. 5, it illustrates a spray unit of another watering device. In this embodiment, a bevel is set on the chamber near the water inlet side 101 for guiding the surface in rear of the rotor 20. The chamber near the water outlet side 102 has a longitudinal interior, and three stoppers 18 protruding on its inner annular wall are arranged equiangular. Multiple slots 282 are arranged radially in an annular form on the water outlet of the rotor 20, the slots 282 are provided as guide members for placing the stoppers 18, in this way, the rotor 20 moves steadily along the interior surface of the chamber 17 about the center axis 171 of the chamber 17 and with its tilt arrangement and a self-rotation of rotor 20 about the longitudinal axis 201 of the rotor 20 is prevented.

The present disclosure provides an embodiment, wherein the number of the guide members 281, 282 is integer multiple of the number of the stoppers 18, to maintain rotational balance.

Figure 6:
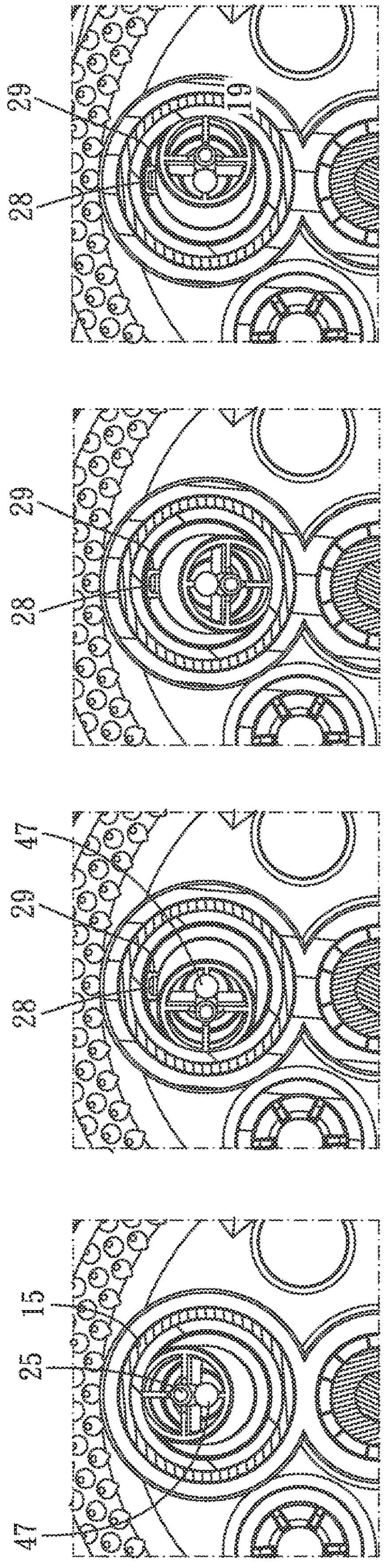
FIG. 6 and FIG. 7 illustrates a rotational movement of rotor in the embodiment of the instant disclosure.
Figure 7:
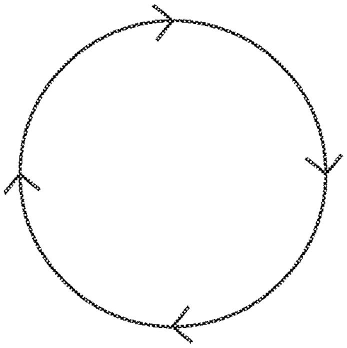

FIG. 6 illustrates a rotational movement of the rotor of another watering device. In some embodiment, the rotor has one guide member 28, the housing 15 having one slot 19, the water inlet of the rotor confining into the annular track between the inner wall of the chamber and an outer wall of the position rod 47. The guide member 28 at the water inlet of the rotor radially protrudes from the longitudinal axis of the rotor, and is confined into the slot 19. The complementary mechanism of the guide member 28 and the slot 19 enables the water inlet of the rotor to move along the center axis of the chamber in a circular path shown as FIG. 7, but to prevent the outlet of the rotor from rotating about the longitudinal axis of the rotor. As a result, the self-rotation of the rotor is prevented, and the centralized linear current spraying out from the water outlet of the rotor with a spiral shape.

What is claimed is:

1. A spray unit of a watering device, the spray unit comprising a mounting member and a housing for mutually confining a chamber, a rotor installed inside the chamber, the rotor being formed as a column and having a longitudinal axis, the rotor having a water inlet and a water outlet on two ends of the column, wherein:

a water inlet side of the mounting member extends to a water outlet side of the housing in a direction aligned to a center axis of the chamber, the water outlet of the column being connected with thea water outlet side of the housing, and the longitudinal axis of the rotor is tilted relative to the center axis of the chamber;

wherein either an inner annular wall of the water outlet side of the housing or the water outlet of the rotor is provided with at least one slot while the other one is provided with at least one guide member in a radial direction to be correspondingly matched to the at least one slot, wherein the matching of the at least one slot and the at least one guide member locates the water outlet of the rotor on the water outlet side of the housing, to enable the rotor to move along an interior surface of the chamber about the center axis of the chamber, but to prevent the rotor from self-rotating about the longitudinal axis of the rotor at the same time.

2. The spray unit as in claim 1, wherein a flow director is deployed between the housing and the mounting member, the flow director being provided with at least one guide vane and a position rod aligned to the center axis of the chamber.

3. The spray unit as in claim 2, wherein the flow director has an annular base located on the mounting member and a center base, the at least one guide vane connects to an inner wall of the annular base and an outer wall of the center base.

4. The spray unit as in claim 2, wherein a rod body is extendedly set on the water inlet of the rotor for locating on an outer wall of the position rod extended from the flow director.

5. The spray unit as in claim 2, wherein the flow director and a bottom of the mounting member are arranged in a partition formation.

6. The spray unit as in claim 1, wherein the rotor has an inner wall equipped with at least one current blade.

7. The spray unit as in claim 1, wherein the water outlet of the rotor is a spherical end forming a complementary mechanism to the water outlet side of the housing.

8. The spray unit as in claim 1, wherein the at least one slot is provided on an outer annular surface of the water outlet of the rotor, and the at least one guide member is protruding from the inner annular wall of the water outlet side of the housing.

9. The spray unit as in claim 1, wherein the inner annular wall of the water outlet side of the housing is provided with the at least one slot, wherein the at least one guide member is at least one stop rod protruding radially on the water outlet of the rotor.

10. The spray unit as in claim 1, wherein the housing has at least one stopper being provided with a bevel.

* * * * *